(12) United States Patent
Whitmarsh et al.

(10) Patent No.: US 6,802,095 B1
(45) Date of Patent: Oct. 12, 2004

(54) RAMP ASSEMBLY HAVING A LIFT AND LOCK MECHANISM

(75) Inventors: Sean Whitmarsh, Castaic, CA (US); Miguel Monge, Palmdale, CA (US)

(73) Assignee: Ricon Corporation, Panorama City, CA (US)

(*) Notice: Subject to any disclaimer, the term of this patent is extended or adjusted under 35 U.S.C. 154(b) by 0 days.

(21) Appl. No.: 10/351,169

(22) Filed: Jan. 23, 2003

Related U.S. Application Data

(60) Provisional application No. 60/351,943, filed on Jan. 25, 2002.

(51) Int. Cl.[7] .................................................. E01D 1/00
(52) U.S. Cl. ........................... 14/71.3; 14/71.1; 14/69.5; 414/480; 414/921
(58) Field of Search ................................. 14/69.5, 71.1, 14/71.3; 414/480, 546, 921; 105/436; 296/61; 410/6

(56) References Cited

U.S. PATENT DOCUMENTS

| | | | | |
|---|---|---|---|---|
| 4,282,621 A | * | 8/1981 | Anthony et al. | 14/71.1 |
| 4,534,450 A | * | 8/1985 | Savaria | 414/546 |
| 4,685,858 A | * | 8/1987 | Manning et al. | 414/537 |
| 4,759,682 A | * | 7/1988 | Hood | 414/537 |
| 4,845,792 A | * | 7/1989 | Bakula et al. | 14/69.5 |
| 4,850,788 A | * | 7/1989 | Dickson | 414/537 |
| 4,966,516 A | * | 10/1990 | Vartanian | 414/537 |
| 5,160,236 A | * | 11/1992 | Redding et al. | 414/537 |
| 5,257,894 A | * | 11/1993 | Grant | 414/537 |
| 5,259,081 A | * | 11/1993 | Henderson | 14/71.1 |
| 5,284,414 A | * | 2/1994 | Kempf | 414/545 |
| 5,305,486 A | * | 4/1994 | Smith et al. | 14/69.5 |
| 5,380,144 A | * | 1/1995 | Smith et al. | 414/537 |
| 5,391,041 A | * | 2/1995 | Stanbury et al. | 414/537 |
| 5,393,192 A | * | 2/1995 | Hall et al. | 414/537 |
| 5,433,580 A | * | 7/1995 | Kempf | 414/540 |
| 5,542,811 A | * | 8/1996 | Vartanian | 414/541 |
| 5,636,399 A | * | 6/1997 | Tremblay et al. | 14/71.1 |
| 5,832,555 A | * | 11/1998 | Saucier et al. | 14/71.1 |
| 5,944,473 A | * | 8/1999 | Saucier et al. | 414/546 |
| 6,186,733 B1 | * | 2/2001 | Lewis et al. | 414/537 |
| 6,203,265 B1 | | 3/2001 | Cohn et al. | 414/537 |
| 6,210,098 B1 | | 4/2001 | Cohn et al. | 414/537 |
| 6,238,168 B1 | | 5/2001 | Cohn et al. | 414/537 |
| 6,238,169 B1 | * | 5/2001 | Dupuy et al. | 414/546 |
| 6,409,458 B1 | * | 6/2002 | Cohn et al. | 414/537 |

OTHER PUBLICATIONS

RICON "S–Series Personal Use Wheelchair Lift", Owner Manual, table of contents 4 pages, May, 16, 2001.*
RICON "PF 4000Series Low Floor Vehcile Access Ramp for Custom Installation", Operators Manual, Feb. 29, 2001.*

* cited by examiner

Primary Examiner—Gary S. Hartmann
(74) Attorney, Agent, or Firm—Jeffer, Mangels, Butler & Marmaro LLP

(57) ABSTRACT

A ramp assembly for installation in a vehicle includes a ramp platform having a stowed configuration in the vehicle, a deployed configuration extending from the vehicle, and a lift and lock mechanism. The lift and lock mechanism is configured to lock the ramp platform in place when the platform is in a stowed configuration and to facilitate the lifting of the platform when the platform is deployed.

2 Claims, 14 Drawing Sheets

RAMP ASSEMBLY HAVING A LIFT AND LOCK MECHANISM

CROSS-REFERENCE TO RELATED APPLICATIONS

This application claims priority from U.S. Provisional Patent Application No. 60/351,943 filed on Jan. 25, 2002, the contents of which are incorporated herein by reference.

FIELD OF THE INVENTION

The present invention relates generally to ramp assemblies installed in vehicles to facilitate transportation of wheelchair occupants.

BACKGROUND OF THE INVENTION

A growing concern exists for persons who are physically challenged or otherwise have limited mobility. That concern has given rise to the development of lifts and ramps for transporting occupied wheelchairs, and the like, in and out of vehicles. Typically, these lifts and ramps are stored in the vehicles when not in use and deployed when it is necessary to provide passenger access.

Proposed wheelchair ramps have included "vertically stowed" ramps which are pivotally connected at a lower edge to the vehicle floor. Such ramps are typically stored in an upright vertical position and are deployed by swinging the ramp outwardly from the vehicle about the bottom edge. In these types of ramps, the platform moves through a substantial range of motion, the upper edge starting from a relatively high position and ending at a relatively low position. With such a substantial range of motion, there may be undesirable motions or displacements in which the platform may move to unwanted positions, or even free fall through space.

Proposed wheelchair ramps have also included "horizontally stowed" ramps which translate from below the vehicle floor in a horizontal stowed position to a deployed position where the ramp extends beyond the vehicle. Although these ramps may be designed differently than the proposed "vertically stowed" wheelchair ramps, the structure of the vehicle may have to be modified to enable storage of the ramp in a horizontal stowed position. Furthermore, when the "horizontally stowed" ramp is installed, its installation may be obstructed by vehicle components such as a door track, a door threshold, a structural support bar or similar vehicle structure. This makes installation difficult. Consequently, there exists a need for a ramp assembly which is relatively simple in design and structure, can fit into a compact space in the vehicle with minimal required modification of the structural support system of the vehicle, and deploys in a manner that avoids obstruction by typical vehicle structure.

During the storage configuration of the ramp assembly, the vibrations resulting from the vehicle operation can cause the ramp assembly to bounce or vibrate. The constant vibration can cause noise inside the vehicle. It is desirable to provide a ramp assembly having a locking mechanism that effectively locks the ramp assembly in place when the ramp assembly is in a storage configuration thereby reducing the noise of a vibrating ramp assembly, yet does not require additional controls to overcome the lock and move the ramp towards a deployed state.

SUMMARY OF THE INVENTION

A ramp assembly is disclosed for installation in a vehicle. The ramp assembly includes a ramp platform having a stowed configuration in the vehicle and a deployed configuration extending from the vehicle and a lift and lock mechanism configured to lock the ramp platform in place when the platform is in a stowed configuration and to facilitate the lifting of the platform when the platform is deployed.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE INVENTION

Figure 1:
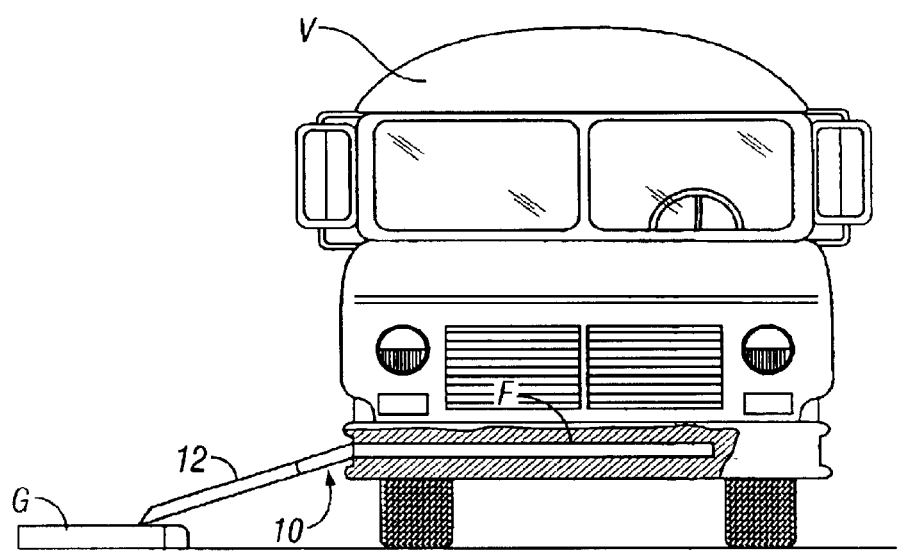
FIG. 1 is a diagrammatic representation of a front view of a vehicle carrying a ramp assembly in accordance with a preferred embodiment of the present invention.
Figure 2A:
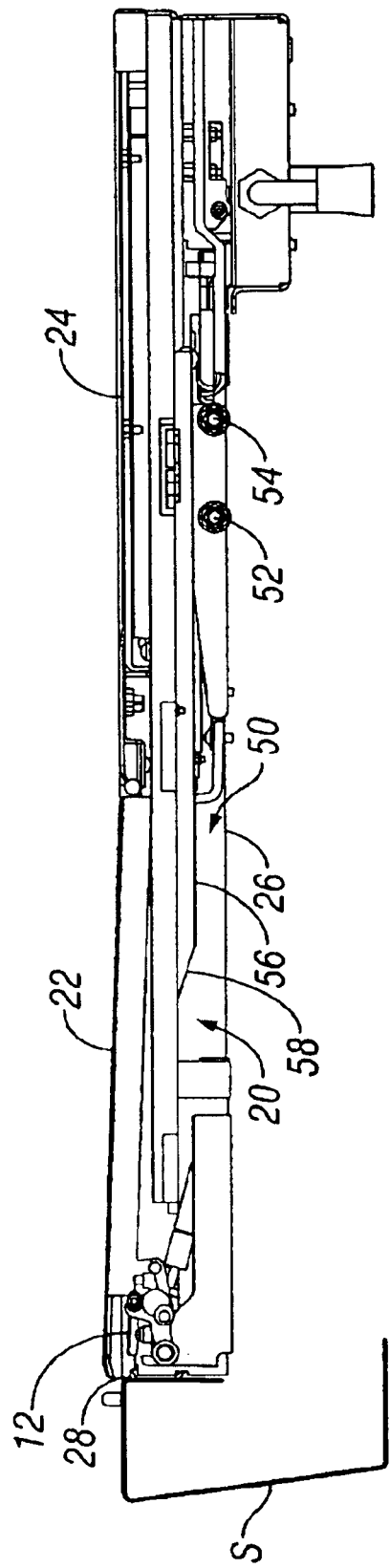
FIGS. 2A through 2F are diagrammatical representations of side elevation views of a preferred embodiment of the ramp assembly of the present invention in various stages of deployment.
Figure 2B:
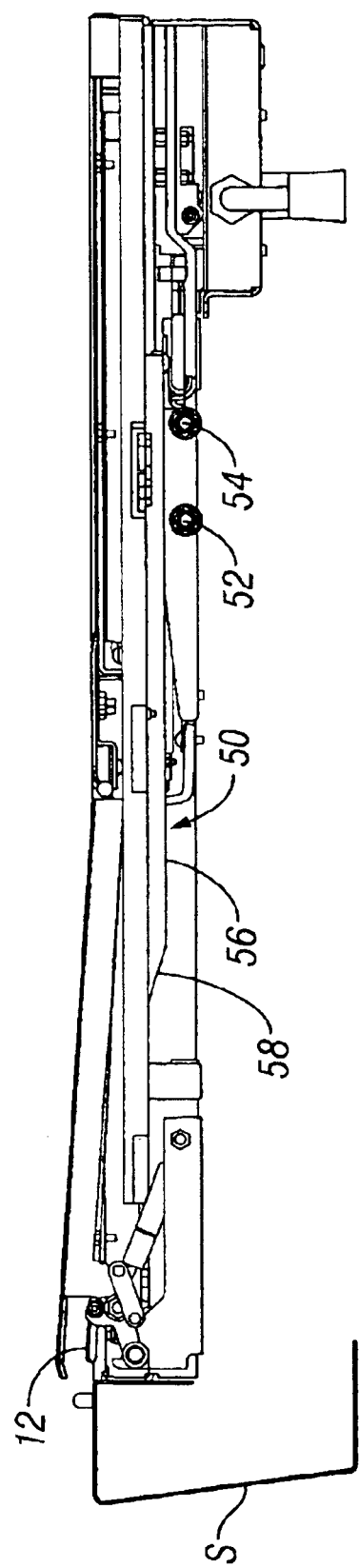
Figure 2C:
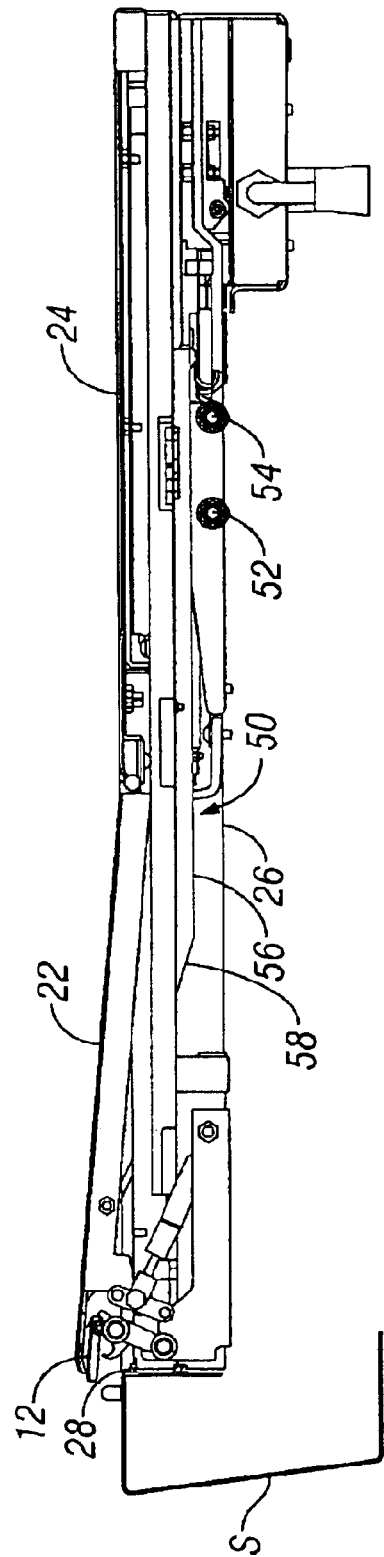
Figure 2D:
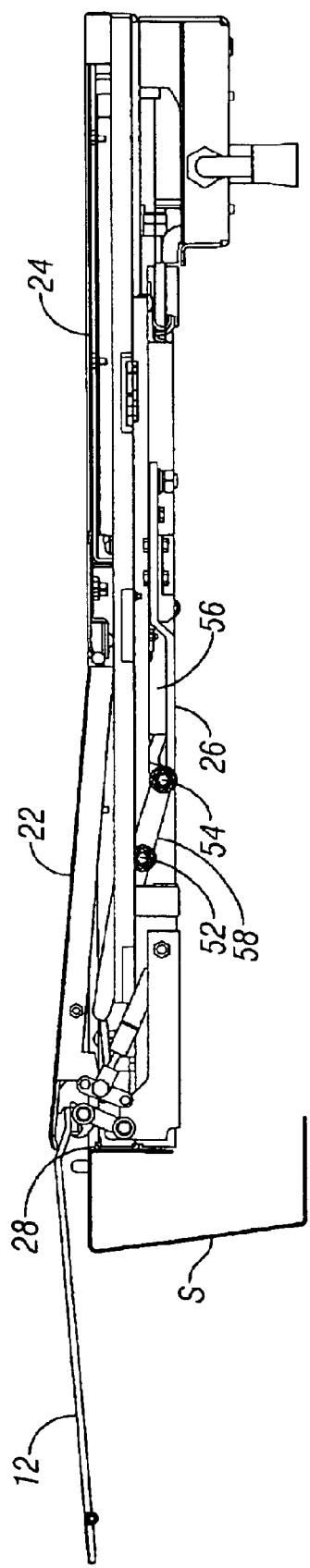
Figure 2E:
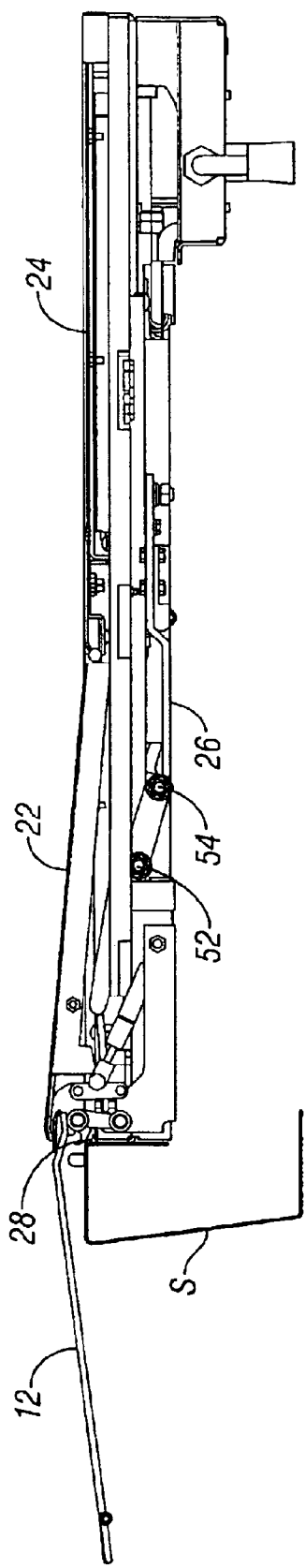
Figure 2F:
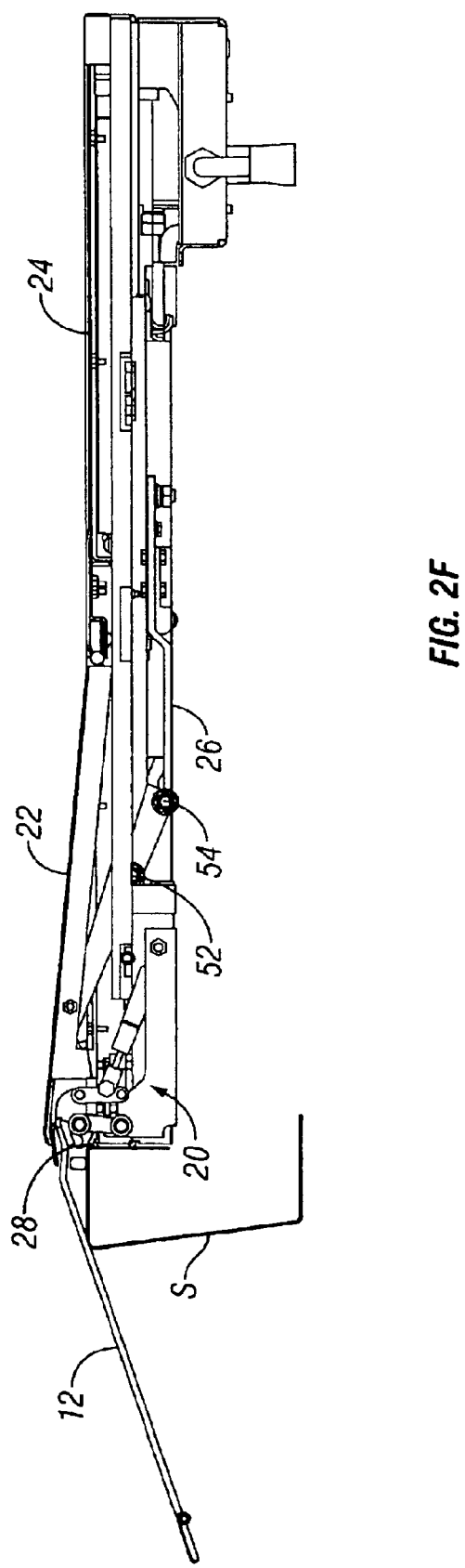

A preferred embodiment of the ramp assembly 10 of the present invention is shown generally in FIG. 1 installed in a vehicle. The vehicle V can be a van, bus, train, trailer, boat, or any other structure for transporting people. In a preferred embodiment of the invention, ramp assembly 10 is secured near the entrance or other appropriate opening of a vehicle and is installed in the floor F of vehicle V to operate through the entrance or opening. When stowed, passengers are supported directly on top of ramp assembly 10. The ramp assembly 10 includes a ramp platform 12 which moves between a fully stowed state and a deployed state. As will be explained more fully below, the movement path of the ramp platform 12 as it deploys includes an upwardly inclined motion, allowing the platform to rise above a potentially obstructing object or structure in the vehicle, such as a door track or a structural support bar. The ramp platform is preferably hinged thereby allowing the platform to transition to a downwardly inclined motion when the ramp has overcome the obstruction or interfering structure. In a fully extended position, the outer edge of the ramp platform 12 rests on the ground G, providing wheelchair access from the vehicle V to the ground G.

FIGS. 2A through 2F depict a preferred embodiment of the ramp assembly 10 in various stages of deployment. A preferred manner of deployment is described in U.S. Pat. No. 5,832,555 issued on Nov. 10, 1998, which is incorporated herein by reference. Generally, ramp platform 12 is stowed within a mounting structure 20, having top panels 22, 24 and a bottom panel 26. The bottom panel is preferably affixed to the vehicle floor F. The top panels 22, 24 are preferably substantially planar and horizontal so as to function as the passenger floor when the ramp platform 12 is in a stowed configuration.

When in a stowed position, the ramp platform 12 rests between the top panels 22, 24 of the mounting structure 20 and bottom panel 26. When deployed, ramp platform 12 moves relative to the mounting structure 20 between the top panels 22, 24 and bottom panel 26. When in a fully deployed position, ramp platform 12 extends substantially beyond the outer edge 28 of the ramp assembly 10 and projects from between the top and bottom panels 22 and 26.

Figure 3:
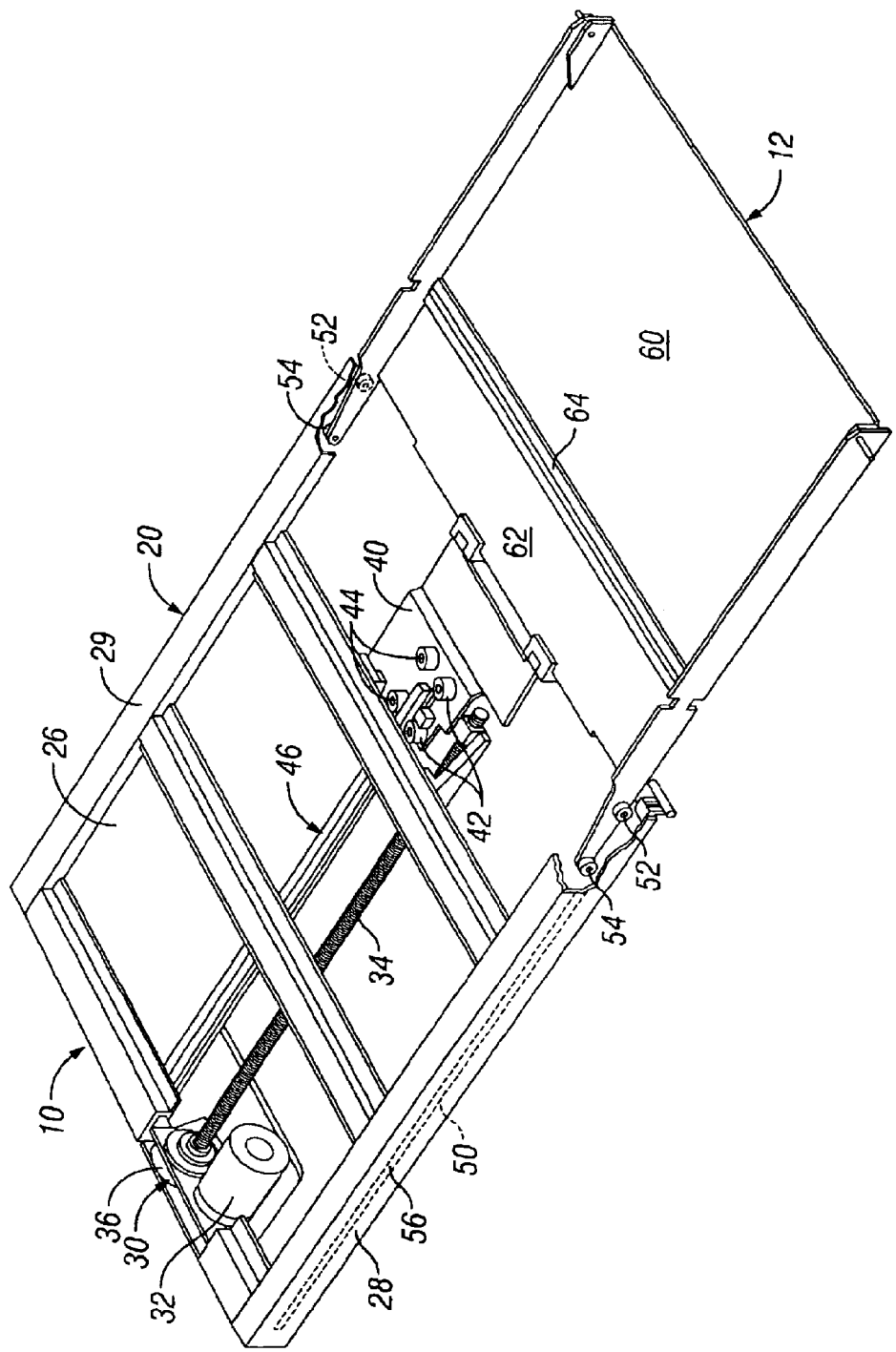
FIG. 3 is a perspective view of a preferred embodiment of the ramp assembly of the present invention without the top panels with the ramp platform in a deployed position.

As shown in FIG. 3, the ramp platform 12 is driven by a drive mechanism 30 energized by a motor 32, as described in U.S. Pat. No. 5,832,555. In a preferred embodiment of the invention, the drive mechanism 30 includes a ball screw 34 which is horizontally disposed and runs in the direction of deployment of the ramp platform 12. A belt 36 connects the motor unit 32 to a pulley which in turn causes the ball screw 34 to rotate when the motor unit 32 is activated. The motor unit 32 can be operated from a remote switch located near the operator of the vehicle or by the operator using a remote control device. This provides the operator of the vehicle the ability to operate the ramp assembly 10 from a remote location. The drive mechanism 30 is not limited to the ball screw design coupled to a motor unit, as described herein, but may include a chain and sprocket mechanism, hydraulics or any other known means for facilitating the movement of a ramp platform 12.

In a preferred embodiment of the invention, a carriage 40 is coupled to the rear of ramp platform 12 for aligning the ramp platform 12 during deployment. Carriage 40 preferably includes a pair of alignment wheels 42, 44 extending therefrom. The alignment wheels 42, 44 engage rail alignment 46 to align the ramp platform 12 within the mounting structure 20 as the ramp platform 12 moves between the stowed position- and the deployed position. The rail alignment 46 is preferably centrally aligned between the side panels 28, 29 of the mounting structure 20. The engagement of the alignment wheels 42, 44 with the rail alignment 46 ensure that the carriage is pushed straight out and does not move from side to side. This feature is particularly useful when the ball screw 34 is positioned on one side, as depicted in FIG. 3. The ball screw 34 is received in a block-alignment guide 48 positioned to the side of the alignment wheels 42, 44. Ball screw 34 rotates through block alignment guide 48 thereby facilitating movement of the ramp platform 12 through the mounting structure 20. Thus, the horizontal movement of ramp platform 12 is actuated by motor unit 32 which in turn rotates ball screw 34 thereby moving ramp platform 12 through mounting structure 20. At the same time, alignment wheels 42, 44 in engagement with rail alignment 46 center the ramp platform in the mounting structure 20. Once fully deployed, ramp platform 12 can be retracted from a deployed position to a stowed position by reversing the direction of motor unit 32.

In a preferred embodiment of the invention, the movement path of the ramp platform 12 is guided by cam guides 50. Cam guides 50 are defined by channels in side panels 28, 29 of the mounting structure 20. The cam guides 50, shown in FIG. 3, substantially extend the length of the side panels 28, 29. The shape of the cam guides 50 determine the movement path of the ramp platform as explained below. The ramp platform 12 preferably includes cam followers 52, 54 that rotate along cam guides 50 facilitating the horizontal movement of the ramp platform 12. In a preferred embodiment of the invention, the cam guides 50 have a straight portion 56 (shown in FIG. 3) and an inclined portion 58 (shown in FIGS. 2A through 2F). As the cam followers 52, 54 travel along the straight portion 56 of the cam guide 50, the ramp platform 12 is maintained in a substantially horizontal position. During deployment, when the first cam follower 52 arrives at the inclined portion 58 best shown in FIG. 2D, the shape of the cam guide 50 causes the ramp platform 12 to pivot upward. Specifically, the inclined portion 58 of the cam guide 50 causes cam follower 52 to move upwardly relative to cam follower 54, thereby causing the ramp platform 12 to pivot upward. The upwardly inclined motion allows the ramp platform 12 to rise above a potentially obstructing object or structure S in the vehicle, such as a door track or a structural support bar. Because the ramp platform 12 is raised to clear potentially obstructing objects, there is no need to remove or modify structural components of the vehicle to accommodate the ramp assembly.

As shown in FIG. 3, in a preferred embodiment of the invention, the ramp platform 12 includes a first portion 60 pivotally connected to a second portion 62. The first portion 60 and second portion 62 are preferably connected by a hinge 64 which runs the entire width of the ramp platform 12. During deployment, when the ramp platform 12 has risen over obstruction S and cleared it, gravitational force on the ramp platform 12 causes the first portion 60 to pivot downward toward the ground surface (shown in FIG. 2F). Accordingly, the ramp platform 12 transitions to a downwardly inclined motion when the ramp has overcome the obstruction or interfering structure. In a fully extended position, the outer edge of the ramp platform 12 rests on the ground, providing wheelchair access from the vehicle to the ground.

In a preferred embodiment of the present invention, the ramp assembly 10 includes a lift and lock mechanism 80 that facilitates the lifting of the platform over an interfering or obstructing structure when the platform is deployed and effectively locks the platform in place when the platform is in a stowed configuration. A preferred embodiment of the lift and lock-mechanism 80 of the present invention is shown in FIGS. 4A, 4B and 5, and described in detail below.

Figure 4A:
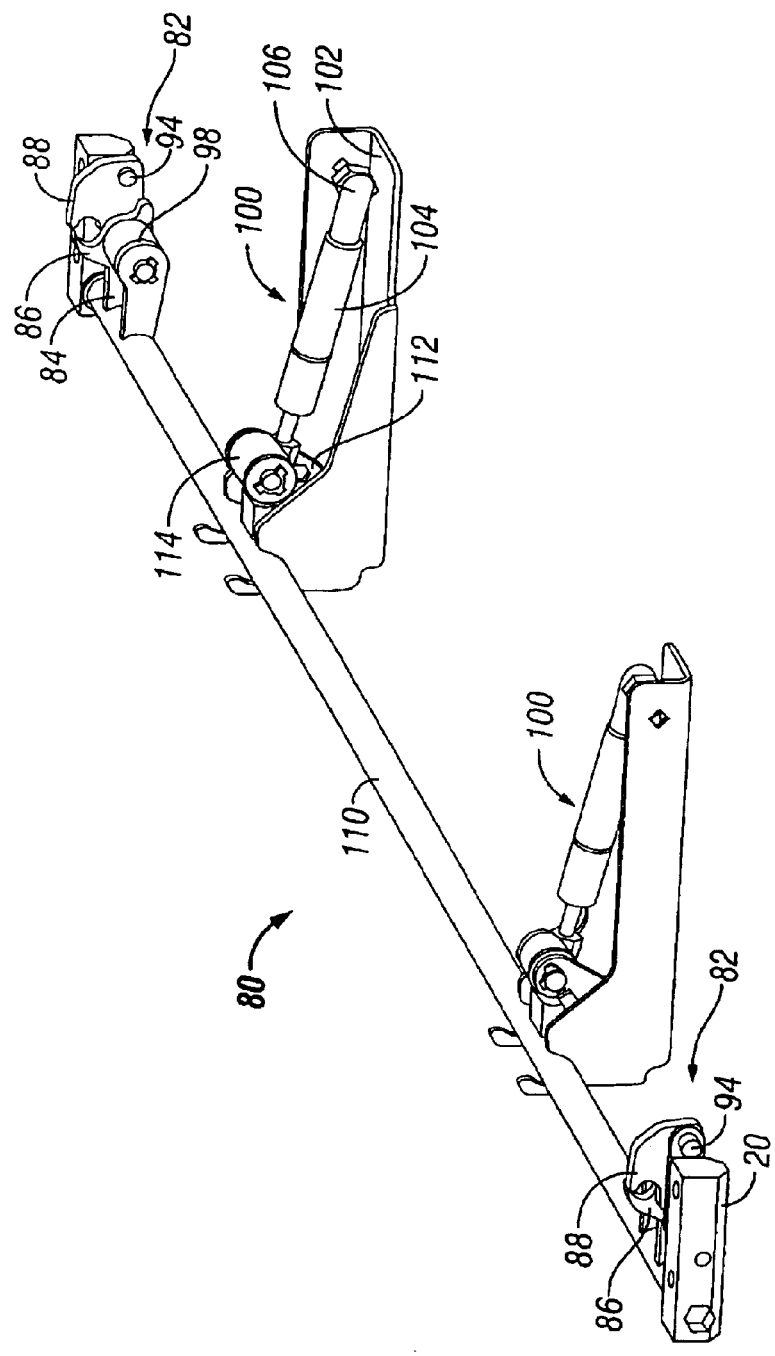
FIGS. 4A and 4B are perspective views of a preferred embodiment of the lift and lock mechanism of the present invention without the ramp platform in a stowed and deployed position, respectively.
Figure 4B:
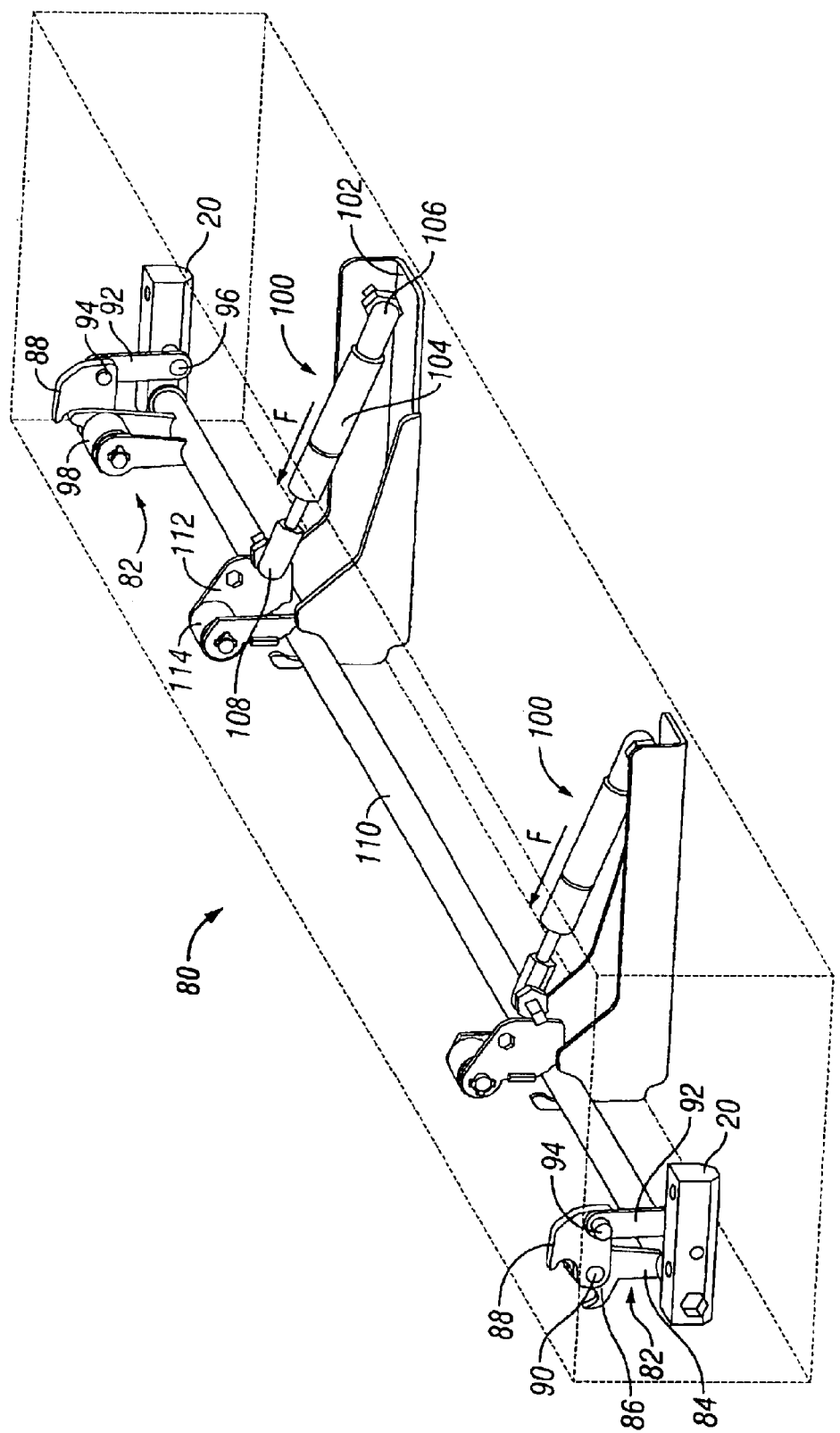
Figure 5:
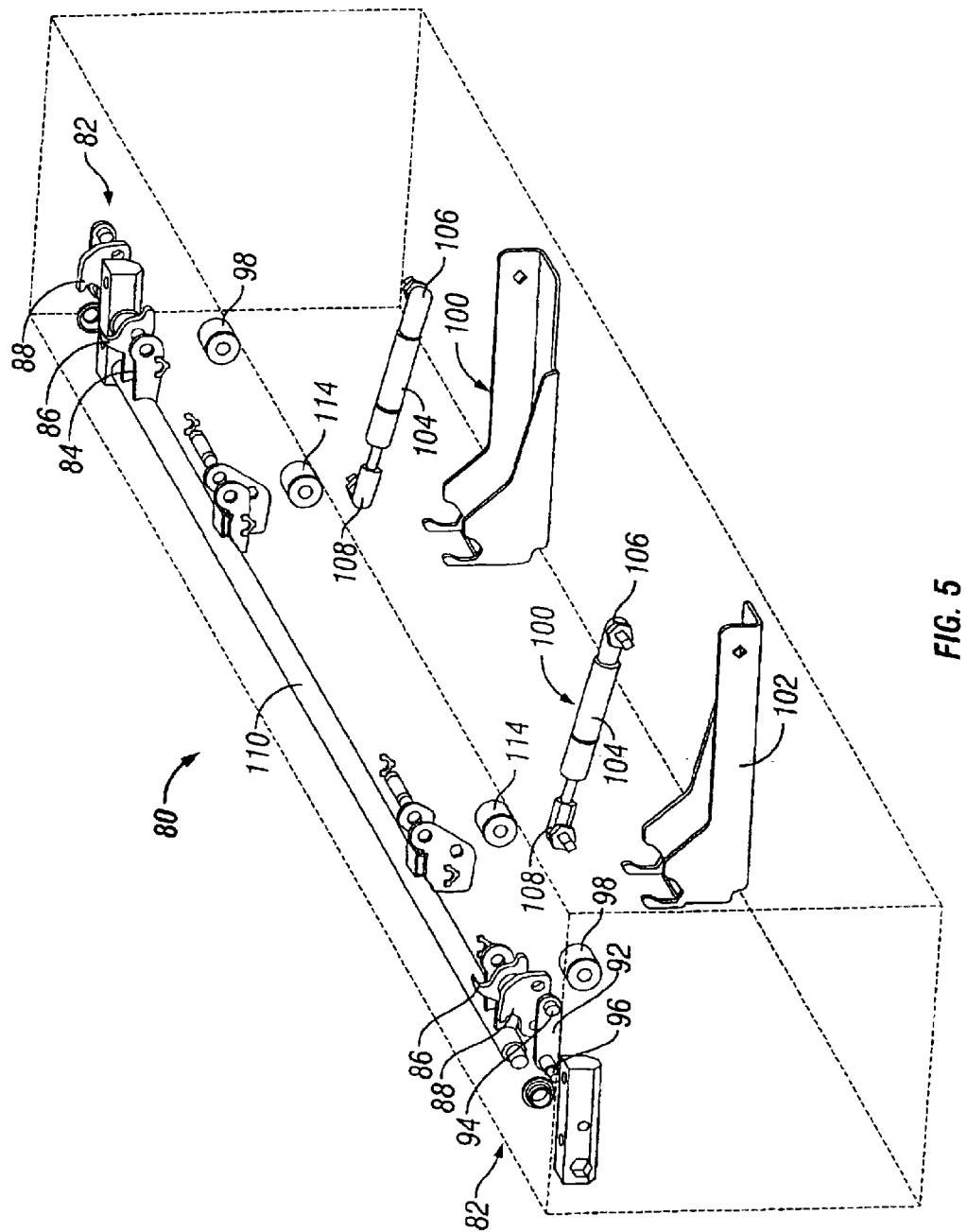
FIG. 5 is an exploded view of the lift and lock mechanism shown in FIGS. 4A and 4B.

A preferred embodiment of the lift and lock mechanism 80 of the present invention, as shown in FIGS. 4A and 4B, includes a pair of hook assemblies 82 and a pair of biasing assemblies 100. The hook assemblies 82 and biasing assemblies 100 are each operatively connected to shaft 110. As best shown in FIG. 4B, each hook assembly 82 preferably includes a front link 84 having a front hook 86. The front link 84 is preferably attached to shaft 110 such that force applied to the front hook 86 of the front link 84 translates to rotational motion of shaft 110. Each hook assembly 82 preferably further includes a rear hook 88 pivotally attached to the front hook 86 at pivot point 90, and a rear link 92 pivotally attached to rear hook 88 at pivot point 94. The rear link 92 is preferably pivotally attached to the mounting structure 20 at pivot point 96 (best shown in FIGS. 6A–6C).

The term "hook" is used herein to refer to a structure having a surface that is capable of receiving a pin or tab therein while allowing movement of the pin or tab relative to the surface. The surface is preferably curved; however, it is envisioned that a hook can be used having straight walls.

Figure 8:
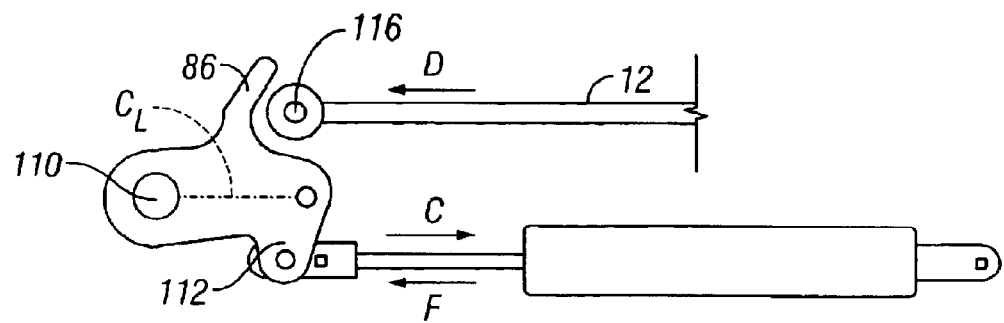
FIG. 8 is a schematic view depicting the operation of the biasing assembly in combination with the hook assembly of the present invention.

In a preferred embodiment of the invention, the biasing assemblies 100 include a bracket 102 fixedly attached to the bottom panel 26 of the mounting structure 20. Each biasing assembly 100 includes a biasing element 104 having a first end 106 attached to the bracket 102 and a second end 108 operatively attached to the shaft 110. In a preferred embodiment, the biasing element is an air spring; however, it is envisioned that any type of biasing element can be used. The biasing element 104 is configured to exert a force. The direction of force F is shown in FIGS. 4B and 8. As will be explained in greater detail below, the force F exerted by the biasing element 104 is used to both facilitate the raising and extending of the ramp platform 12 during deployment and the locking of the ramp platform 12 when in a stowed position. In a preferred embodiment, the second end 108 of biasing element 104 is attached to bracket 112 which is in turn, attached to shaft 110.

To facilitate the movement of the ramp platform 12, the hook assemblies 82 each have rollers 98 and the biasing assemblies 100 each have rollers 114. During deployment, the ramp platform 12 rests on top of rollers 98 and 114. The rollers 98, 114 enable the ramp platform 12 to move smoothly in the deployment direction, minimizing friction.

Figure 6A:
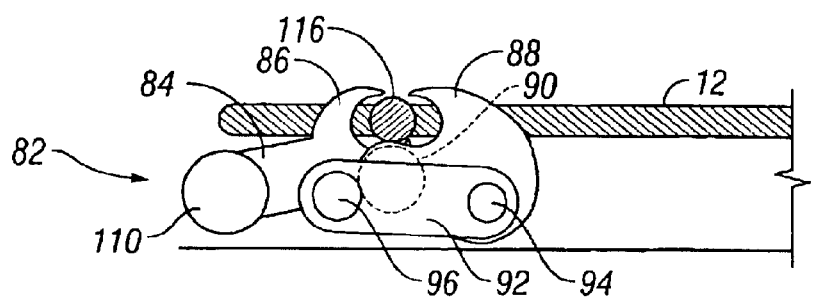
FIGS. 6A–6C are partial side views of the preferred embodiment of the hook assemblies of the present invention in various stages of deployment.
Figure 6B:
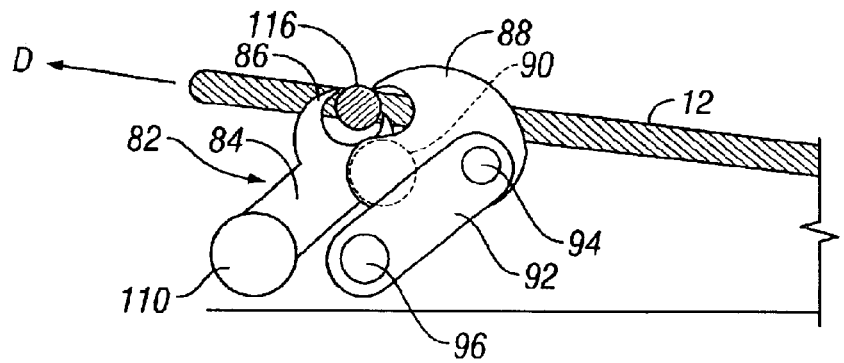
Figure 6C:
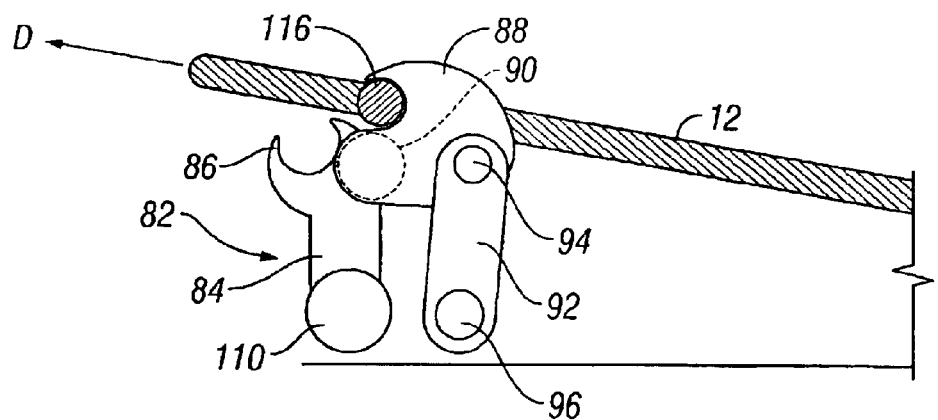

During deployment of the ramp platform 12, the lift and lock mechanism 80 facilitates the lifting of the ramp platform 12 and forms part of the bridge that overcomes the interfering obstruction S. As shown in FIGS. 6A through 6C, the ramp platform 12 preferably includes an engagement tab 116 that interacts with the hook assembly 82. In a stowed position, as shown in FIG. 6A, the engagement tab 116 of the ramp platform 12 is captured between the front hook 86 and rear hook 88 of the hook assembly 82. As the ramp platform 12 is deployed in the deployment direction D, the engagement tab 116 of the ramp platform 12 exerts force on the front hook 86. As previously described, front hook 86 is preferably attached to shaft 110 by front link 84 such that force applied to the front hook 86 is preferably in the deployment direction D and translates to rotational motion of shaft 110. The front hook 86 is also pivotally attached to rear hook 88 at pivot point 90. As the front hook 86 is pushed in the deployment direction D, the rear hook 88 follows in the deployment direction D. The front and rear links 84, 92 and the front and rear hook portions 86, 88, preferably form a parallelogram structure (best seen in FIGS. 6B and 6C). As the hook assembly 82 moves in the deployment direction D, the parallelogram structure rises facilitating the lifting of the ramp platform 12. Furthermore, the parallelogram structure ensures a stable, continuous movement path for the ramp platform 12.

Figure 7A:
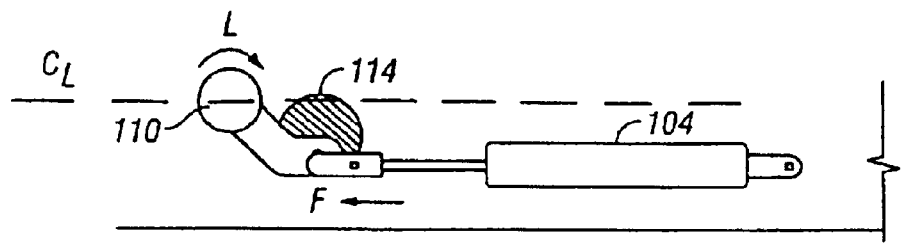
FIGS. 7A–7C are partial side views of the preferred embodiment of the biasing assemblies of the present invention in various stages of deployment.
Figure 7B:
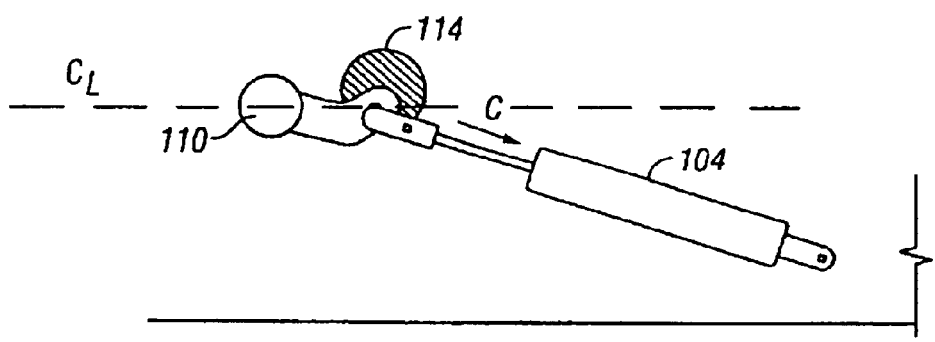
Figure 7C:
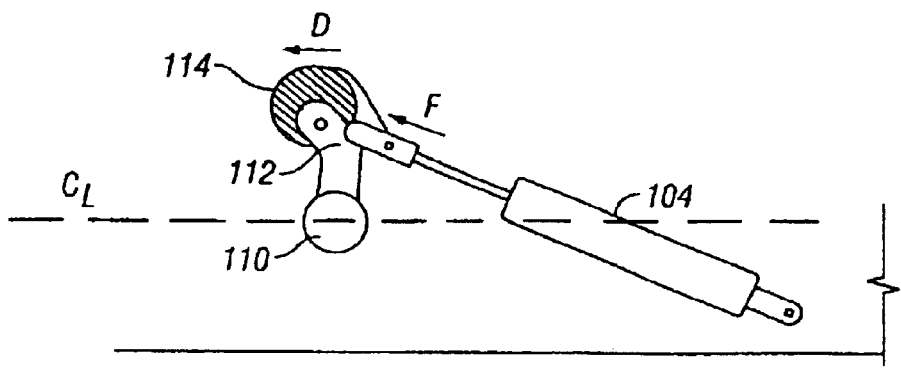

In a preferred embodiment of the invention, the motion of the ramp platform 12 is further supported by the force exerted by the biasing assemblies 100. FIGS. 7A through 7C depict the position of the biasing assemblies 100 corresponding to the position of the hook assemblies 82 shown in FIGS. 6A through 6C, respectively. As shown in FIG. 6A, when the ramp platform 12 is in a stowed position, the engagement tab 116 of the ramp platform 12 is captured between the front and rear hooks 86, 88 of the hook assembly and the front and rear hooks 86, 88 preferably form a closed loop about the engagement tab 116. At the same time, as shown in FIG. 7A, the biasing element 104 is exerting a force F on the shaft 110, thereby biasing the shaft 110 in a locked direction L. The force of the biasing element 104 biases the hook assembly 82 in a stowed position, effectively locking the ramp platform 12 in a stowed position.

FIG. 8 is a diagrammatical depiction of the operation of the lift and lock mechanism 80. As the ramp platform 12 moves from a stowed position to a deployed position, engagement tab 116 exerts force on front hook 86. Front hook 86 causes shaft 110 to rotate. As the shaft rotates, it exerts force on bracket 112, causing the biasing element to initially contract in direction C. As the shaft 110 rotates further, the biasing element 104 is eventually lifted above the center line CL at which point, the biasing element exerts force in the direction F, thus facilitating the deployment of the ramp platform 12. Accordingly, the same biasing element 104 is used to bias the platform in a locked position when stowed, and thereafter biases the ramp platform 12 in a deployment direction once the biasing element 104 has been lifted above the center line CL. As shown in FIG. 7C, after the biasing element 104 has been lifted above center line CL, the biasing element 104 exerts a force in the direction F, pushing the bracket 112 and roller 114 in the deployment direction D.

Figure 9:
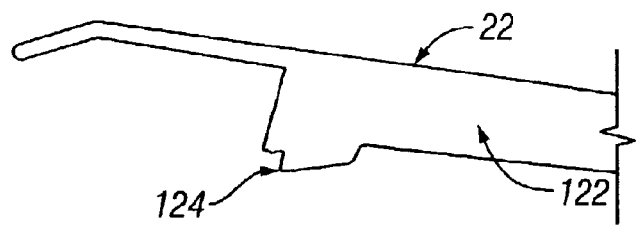
FIG. 9 is a partial side view of a preferred embodiment of the ramp platform having a latch mechanism.
Figure 10:
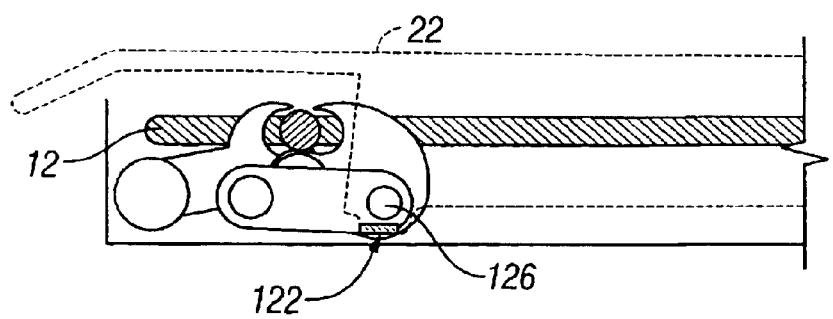
FIG. 10 is a partial side view of a preferred embodiment of the ramp assembly of the present invention showing engagement of the latch mechanism of the ramp platform with the hook assembly.

In a stowed position, when the ramp platform 12 is effectively locked, the ramp platform 12 will not bounce up and down, thereby reducing vibration and noise. In a preferred embodiment of the invention, as shown in FIG. 9, the top panel 22 has a side wall 122 that includes a latch 124. When in a stowed position, the latch 124 preferably engages a pin 126 (shown in FIG. 10) to lock the top panel 22 in a stowed position. In a preferred embodiment of the invention, pin 126 is the same as the pivot point 94 connecting the rear link 92 to the rear hook 98. When latch 124 engages pin 126, the top panel 22 can not be lifted. Upon deployment of the ramp platform 12, pin 126 rises thereby releasing latch 124.

The embodiments described above are exemplary embodiments of a ramp assembly having a lift and lock mechanism. Those skilled in the art may now make numerous uses of, and departures from, the above-described embodiments without departing from the inventive concepts disclosed herein. Accordingly, the present invention is to be defined solely by the scope of the following claims.

The claim elements that include the words "means for" are intended to be interpreted under Section 112, paragraph 6 of the patent laws. The claim elements which do not include the words, "mean for," should not be considered "means for" claims falling under the Section 112, paragraph 6 purview.

What is claimed is:

1. A ramp assembly for installation in a vehicle, the ramp assembly comprising:
    a ramp platform having a stowed configuration in the vehicle and a deployed configuration extending from the vehicle; and
    a lift and lock mechanism configured to lock the ramp platform in place in a stowed configuration and to facilitate the lifting of the platform in a deployed configuration, wherein the lift and lock mechanism comprises a hook assembly adapted to capture the ramp platform in the stowed configuration, the hook assembly comprising a front hook and a rear hook pivotally attached to the front hook, wherein in a stowed configuration the front hook and rear hook form a closed loop to capture the ramp platform.

2. A ramp assembly in accordance with claim 1 further comprising a front link attached to the front hook and a rear link pivotally attached to the rear hook.

* * * * *